United States Patent [19]

Moore

[11] Patent Number: 4,902,725

[45] Date of Patent: Feb. 20, 1990

[54] PHOTOCURABLE ACRYLIC COATING COMPOSITION

[75] Inventor: James E. Moore, Mt. Vernon, Ind.

[73] Assignee: General Electric Company, Pittsfield, Mass.

[21] Appl. No.: 268,314

[22] Filed: Nov. 7, 1988

Related U.S. Application Data

[62] Division of Ser. No. 944,031, Dec. 22, 1986, abandoned.

[51] Int. Cl.$^4$ ............................................. C08F 2/50
[52] U.S. Cl. ....................................... 522/42; 522/44; 522/75; 522/77; 522/78; 522/79; 428/412
[58] Field of Search ................. 522/42, 44, 75, 78, 522/79

[56] References Cited

U.S. PATENT DOCUMENTS

| | | | |
|---|---|---|---|
| 2,976,259 | 3/1961 | Hardy et al. | 524/338 |
| 3,043,709 | 7/1962 | Ambrorski | 428/421 |
| 3,161,615 | 12/1964 | Goldberg | 528/196 |
| 3,169,121 | 2/1965 | Goldberg | 524/603 |
| 3,182,076 | 5/1965 | Holdstock | 528/41 |
| 3,220,973 | 11/1965 | Goldberg | 528/196 |
| 3,309,220 | 3/1967 | Osteen | 427/160 |
| 3,312,659 | 4/1967 | Kurkjy et al. | 528/196 |
| 3,312,660 | 4/1967 | Kurkjy et al. | 528/196 |
| 3,582,398 | 6/1971 | Ringler | 524/336 |
| 3,666,614 | 5/1972 | Snedeker et al. | 428/412 |
| 3,968,305 | 7/1976 | Oshima et al. | 522/182 |
| 3,968,309 | 7/1976 | Matsuo et al. | 522/79 |
| 4,049,443 | 8/1962 | Coleman | 252/393 |
| 4,129,667 | 12/1978 | Lorenz et al. | 522/78 |
| 4,198,465 | 4/1980 | Moore et al. | 522/44 |
| 4,284,485 | 8/1981 | Berner | 522/42 |
| 4,339,474 | 7/1982 | Kishida | 522/75 |
| 4,347,111 | 8/1982 | Gehlhaus | 522/42 |
| 4,384,026 | 5/1983 | Moore et al. | 428/412 |
| 4,410,594 | 10/1983 | Olson | 428/412 |
| 4,455,205 | 6/1984 | Olson | 522/44 |
| 4,477,529 | 10/1984 | Campbell | 522/77 |
| 4,547,394 | 10/1985 | Herz | 522/42 |

OTHER PUBLICATIONS

*Irgacure 184—Photoinitiator for UV Curing of Coatings*, Ciba-Geigy Adverstisement, 1982.
Gatechair, "Weathering of UV Cured Coatings", UV Curing—Science and Technology, vol. 2, edited by Pappas; Technology Marketing Corp., Norwal, Conn., (1985), pp. 283-284 and 308-313.

*Primary Examiner*—Lewis T. Jacobs
*Assistant Examiner*—David Buttner
*Attorney, Agent, or Firm*—Spencer D. Conard

[57] ABSTRACT

A photocured acrylic coat comprised of the photoreaction products of:
(i) at least one photocurable polyfunctional acrylate monomer;
(ii) at least one phenyl ketone photoinitiator; and
(iii) at least one active ultraviolet radiation absorber selected from benzotriazoles, cyanoacrylates, and hydroxybenzophenones. The coating is substantially completely or completely cured and provides improved protection to the substrate against ultraviolet radiation. The coating is also nonopaque or transparent.

6 Claims, No Drawings

PHOTOCURABLE ACRYLIC COATING COMPOSITION

This is a divisional of co-pending application Ser. No. 944,031 filed on 12/22/86 now abandoned.

BACKGROUND OF THE INVENTION

Aromatic carbonate resins are well known thermoplastic resins which, due to their many excellent mechanical properties, are used as thermoplastic engineering materials. The aromatic carbonate resins exhibit, for example, optical clarity, good thermal stability, good impact properties, and toughness. These resins are utilized as films, sheet articles, and molded articles.

However, the aromatic carbonate resins are somewhat susceptible to surface scratching and abrasion, attack by many common solvents, and to degradation by ultraviolet radiation. The problems of relatively low scratch and abrasion resistance and susceptibility to attack by chemical solvents have been addressed by providing various surface coatings on aromatic carbonate resin articles which coatings serve to protect the underlying substrate from scratching and attack by chemical solvents. Among the various coatings used to protect the aromatic carbonate resin articles are the acrylics Some of these acrylic coatings are described in U.S. Pat. Nos. 3,968,305, 3,968,309, and 3,582,398.

Certain acrylic coatings have been found to be particularly advantageous when applied onto aromatic carbonate resin articles. These coatings may generally be characterized as the ultraviolet radiation cured, i.e., photocured, acrylic coatings. U.S. Pat. No. 4,198,465 describes a polycarbonate article having on its surface a UV cured acrylic coating comprised of the photoreaction products of (i) at least one polyfunctional acrylate monomer having from 2 to about 4 functional groups attached to an aliphatic hydrocarbon residue containing 1-20 carbon atoms and optionally having ether linkages and/or hydroxyl groups, (ii) a photoinitiator, and (iii) resorcinol monobenzoate; U.S. Pat. No. 4,384,026 describes an aromatic carbonate resin article having on its surface an ultraviolet radiation cured coating comprised of the photoreaction products of polyfunctional acrylate monomers and acrylic modified polymers; and U.S. Pat. No. 4,477,529 describes a plastic article having adhered thereto a translucent and decorative ultraviolet radiation cured coating which is wrinkled in a macroscopically irregular but microscopically regular manner and comprised of the photoreaction products of (i) at least one polyfunctional acrylate monomer, (ii) certain polysiloxane-polyether block copolymer surfactants, and (iii) azobisisobutyronitrile.

In order to protect the underlying aromatic carbonate resin substrate from degradation by ultraviolet radiation the acrylic coatings may contain ultraviolet radiation absorbers or stabilizers. These ultraviolet radiation absorbers may be latent ultraviolet radiation absorbers such as, for example, resorcinol monobenzoate described in the aforediscussed U.S. Pat. Nos. 4,198,465 and 4,477,529, or active ultraviolet radiation absorbers such as those described in aforediscussed U.S. Pat. No. 4,384,026. The incorporation of ultraviolet radiation absorbers, particularly the active absorbers, into photocurable acrylic coating compositions, however, presents somewhat of a problem since these coating compositions must also contain a photoinitiator or photosensitizer in order to effect the cure of the polyfunctional acrylate monomers. Generally, the presence of the active ultraviolet radiation absorbers in the photocurable coating compositions results in an incomplete cure of the coating composition. This is due to the fact that these active absorbers absorb ultraviolet radiation thereby reducing the amount of said radiation available to activate the photoinitiators. This reduces the effectiveness of the photoinitiators thereby resulting in an incomplete cure of the polyfunctional acrylate monomers. The incomplete cure of the coating composition results in a coating having reduced weathering resistance as compared with a completely cured coating.

While this problem of incomplete cure is generally not significant with the use of latent ultraviolet radiation absorbers such as resorcinol monobenzoate, these latent absorbers are generally not quite as effective as the active absorbers. Thus, while the coatings containing these latent absorbers are quite useful for most applications there nevertheless exist certain applications where coatings exhibiting better protection against ultraviolet radiation are required.

It is, therefore, an object of the instant invention to provide aromatic carbonate resin articles having adhered to at least one surface thereof a photocured acrylic coating containing an active ultraviolet radiation absorber wherein said coating is substantially completely or completely cured and exhibits improved weatherability.

SUMMARY OF THE INVENTION

The instant invention is directed to an aromatic carbonate resin article coated with a photocured acrylic coating containing an active ultraviolet radiation absorber, said coating being substantially completely or completely cured and exhibiting improved weatherability. More particularly, this coating is obtained by the photocure of a photocurable coating composition comprised of (i) at least one photocurable polyfunctional acrylate monomer, (ii) a particular photoinitiator or photosensitizer selected from certain phenyl ketones, and (iii) an active ultraviolet radiation absorber or stabilizer selected from benzotriazoles, hydroxybenzophenone, cyanoacrylates, or mixtures thereof.

DESCRIPTION OF THE INVENTION

It has been surprisingly discovered that by the use of a combination of certain specific photoinitiators and certain active ultraviolet radiation absorbers photocured acrylic coatings containing active UV absorbers can be provided which are completely cured and which exhibit improved weatherability. The presently available photocured coatings containing an active ultraviolet radiation absorber are generally incompletely cured and, therefore, exhibit reduced weatherability. The coatings of the instant invention exhibit substantially the same degree of weatherability as those photocured acrylic coatings containing a latent ultraviolet radiation absorber while at the same time affording improved protection against ultraviolet radiation to the underlying aromatic carbonate substrate.

The instant photocured coatings are obtained by the photocure of a photocurable coating composition comprised of: (i) at least one photocurable polyfunctional acrylate monomer, (ii) at least one particular photoinitiator selected from certain phenyl ketones, and (iii) an active ultraviolet radiation absorber selected from benzotriazoles, hydroxybenzophenones, cyanocarylates, or mixtures thereof.

While these coatings may be applied onto a variety of plastic substrates such as acrylics, polyphenylene ethers, aromatic carbonate resins, and the like, they are particularly useful on aromatic carbonate resin substrates.

The aromatic carbonate resins include both the high molecular weight thermoplastic polycarbonate resins and the copolyester-carbonate resins. Both types of resins are described hereinafter.

The polycarbonate resins utilized in the instant invention are conventional well-known resins which are generally commercially available or may be readily prepared by well-known conventional methods. These polycarbonates, as well as methods for their preparation, are described inter alia in U.S. Pat. Nos. 3,161,615, 3,220,973, 3,312,659, 3,312,660, 3,313,777, 3,666,614, and 3,939,672, all of which are incorporated herein by reference. The polycarbonate resins may be conveniently prepared by the interfacial polymerization process by the coreaction of at least one dihydric phenol with a carbonate precursor. Typically, the dihydric phenols utilized may be represented by the general formula

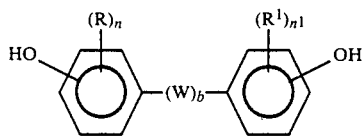

I.

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

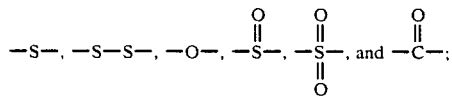

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals contain from 4 to about 8 ring carbon atoms. The preferred aryl radicals contain from 6 to 12 ring carbon atoms, i.e., phenyl, biphenyl, and naphthyl. The preferred aralkyl and alkaryl radicals contain from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those that contain from 6 to about 16 ring carbon atoms.

The monovalent hydrocarbonoxy radicals represented by R and $R^1$ may be represented by the formula $—OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of dihydric phenols of Formula I include:

2,2-bis(4-hydroxyphenyl)propane (bisphenol-A); 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl)decane; 1,4-bis(4-hdroxyphenyl)propane; 1,1-bis(4-hydroxyphenyl)cyclododecane; 1,1-bis(3,5-dimethyl-4-hydroxyphenyl)cyclododecane; 4,4′-thiodiphenol; and bis(4-hydroxyphenyl)ether.

Other dihydric phenols which are useful are described in U.S. Pat. Nos. 2,998,835, 3,028,365, and 3,334,154, all of which are incorporated herein by reference.

The carbonate precursor may be a carbonyl halide; a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl) carbonate, di(chlorophenyl)carbonate, and di(tribromophenyl)carbonate; di(alkylphenyl) carbonates such as di(tolyl)carbonate; di (naphthyl)carbonate, chlorophenyl chloronapthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

A convenient process for the preparation of the instant polycarbonates is the interfacial polymerization process. The interfacial polymerization process utilizes two different solvent media which are immiscible. One solvent medium is an aqueous basic medium. The other solvent medium is an organic medium, such as methylene chloride, which is immiscible in said aqueous medium. Also employed in the interfacial polymerization process are molecular weight regulators which control the chain length or molecular weight of the carbonate polymer by a chain terminating mechanism, and catalysts. The molecular weight regulators are well known in the art and include, but are not limited to, phenol itself, p-tertiarybutyl phenol, and chroman I. The catalysts are also well known in the att and include, but are not limited to, tertiary amines such as triethylamine, quaternary ammonium compounds such as tetraethylammonium bromide, and quaternary phosphonium compounds such as n-butyltriphenyl phosphonium.

Also included within the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds contain at least three functional groups which may be carboxyl, hydroxyl, carboxylic anhydride, haloformyl, and mixtures thereof. Some illustrative non-limiting examples of these aromatic polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

The aromatic copolyester-carbonate resins are likewise well known in the art and are described, along with methods for their preparation, inter alia, in U.S. Pat. No. 3,169,121, incorporated herein by reference. Briefly stated, the copolyester carbonates comprise recurring carbonate groups, carboxylate groups, and aromatic carbocyclic groups in the linear polymer chain in which at least some of the carbonate groups and at least some of the carboxylate groups are bonded directly to ring carbon atoms of the aromatic carbocyclic groups.

These copolyester-carbonates contain ester bonds and carbonate bonds in the polymer chain, wherein the amount of ester bonds is from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonates may conveniently be prepared via the interfacial polymerization process by reacting at least one dihydric phenol, a carbonate precursor, and at least one ester precursor. The ester precursor may be a difunctional carboxylic acid or preferably a reactive ester forming derivative of said difunctional carboxylic acid. Some illustrative non-limiting examples of difunctional carboxylic acids include isophthalic acid and terephthalic acid. Some illustrative non-limiting examples of the reactive ester forming derivatives of the difunctional carboxylic acids are isophthaloyl dichloride and terephthaloyl dichloride.

The active UV absorber containing acrylic coating which is disposed on at least one surface of the aromatic carbonate resin article is obtained by photocuring a photocurable coating composition comprised of (i) at least one polyfunctional acrylate monomer, (ii) a photoinitiator selected from certain acetophenones, and (iii) at least one active UV absorber selected from benzotriazoles, hydroxybenzophenones, and cyanolacrylates. The coating is prepared by applying the coating composition onto the surface of the aromatic carbonate resin article, and then exposing the coating composition to UV radiation of sufficient intensity and for a period of time effective to form said cured coating.

The polyfunctional acrylate monomers which comprise the major portion of the coating composition may be represented by the general formula

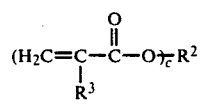

wherein:

$R^3$ is either the methyl radical or hydrogen;

c is an integer having a value of from 2 up to the number of replaceable hydrogen atoms present on $R^2$, preferably from 2 to about 8, more preferably from 2 to about 6, and most preferably from 2 to 4; and $R^2$ is a c functional hydrocarbon residue, a c functional substituted hydrocarbon residue, a c functional hydrocarbon residue containing at least one ether linkage, or a substituted c functional hydrocarbon residue containing at least one ether linkage.

The preferred monomers of Formula II are those wherein $R^3$ is hydrogen.

The c functional hydrocarbon residues represented by $R^2$ include the aliphatic, preferably the saturated aliphatic, hydrocarbon residues, the aliphatic-aromatic hydrocarbon residues, and the aromatic hydrocarbon residues.

Preferred c functional hydrocarbon residues are the c functional aliphatic, preferably saturated, hydrocarbon residues containing from 1 to about 20 carbon atoms, the c functional aliphatic-aromatic hydrocarbon residues containing from 7 to about 20 carbon atoms, and the c functional aromatic hydrocarbon residues containing from 6 to about 14 carbon atoms.

Preferred c valent hydrocarbon residues containing at least one ether linkage are the c valent aliphatic hydrocarbon residues, preferably saturated aliphatic hydrocarbon residues, containing from 1 to about 5 ether linkages and from 2 to about 20 carbon atoms.

Preferred c valent substituted hydrocarbon residues are the c valent aliphatic hydrocarbon residues, preferably the saturated aliphatic hydrocarbon residues, containing from 1 to about 20 carbon atoms, the c valent aliphatic-aromatic hydrocarbon residues containing from 7 to about 20 carbon atoms, and the c valent aromatic hydrocarbon residues containing from 6 to 14 carbon atoms, which contain substituent groups. The number of substituent groups may vary but is preferably from 1 to about 4 substituent groups. The preferred substituent groups are selected from hydroxyl, halogens, amino, nitro, —COOH, and —COOR' wherein R' is an alkyl group of 1 to about 6 carbon atoms or an aryl group of from 6 to 12 ring carbon atoms. The substituent groups may be the same or different if more than one substituent group is present.

Preferred c valent substituted hydrocarbon residues containing at least one ether linkage are the c valent aliphatic hydrocarbon residues, preferably the saturated aliphatic hydrocarbon residues, containing from 2 to about 20 carbon atoms and from 1 to about 5 ether linkages, which contain substituent groups. The number of substituent groups may vary but is preferably from 1 to about 4 substituent groups. The preferred substituent groups are selected from hydroxyl, halogens, amino, nitro, —COOH and —COOR' wherein R' is as defined hereinafore. The substituent groups may be the same or different when more than one substituent group is present.

The more preferred polyfunctional acrylic monomers of Formula II are those wherein $R^3$ is hydrogen and $R^2$ is selected from c functional saturated aliphatic hydrocarbon residues containing from 1 to about 20 carbon atoms, hydroxyl substituted c functional saturated aliphatic hydrocarbon residues containing from 1 to about 20 carbon atoms, c functional saturated aliphatic hydrocarbon residues containing from 2 to about 20 carbon atoms and from 1 to about 5 ether linkages, and hydroxyl substituted c functional aliphatic saturated hydrocarbon residues containing from 2 to about 20 carbon atoms and from 1 to about 5 ether linkages.

When c is 2 in Formula II the c functional acrylates are the diacrylates. When c is 3 in Formula II the c functional acrylates are the triacrylates. When c is 4 in Formula II the c functional acrylates are the tetraacrylates.

Some illustrative non-limiting examples of saturated aliphatic diacrylates and dimethacrylates include:

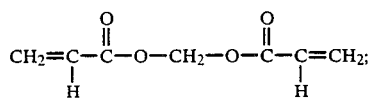
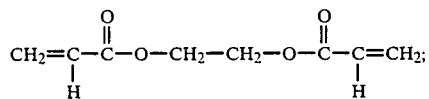
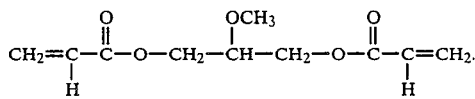
Some illustrative non-limiting examples of saturated aliphatic diacrylates containing at least one ether linkage include:
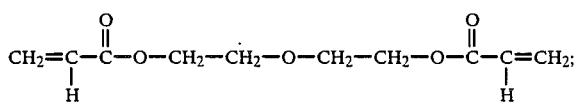
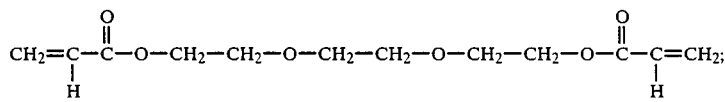
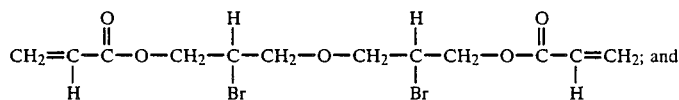
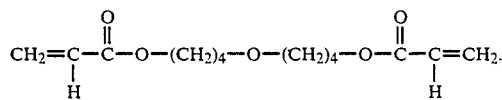
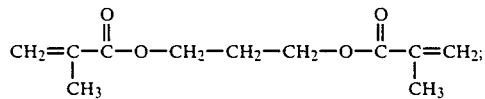
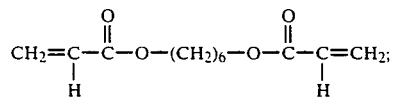
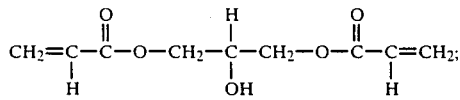
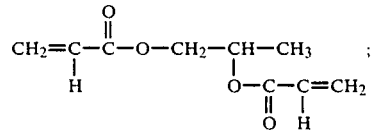
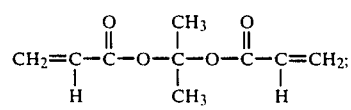
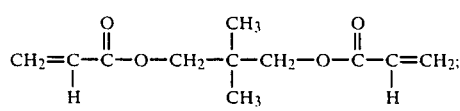
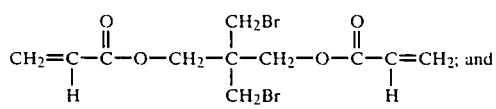
Some illustrative non-limiting examples of aromatic diacrylates include
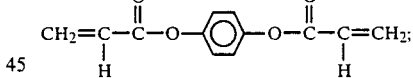
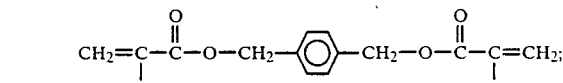
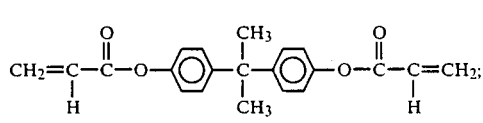
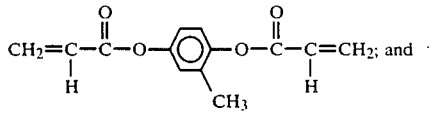
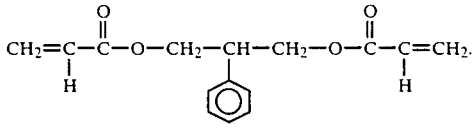
Some illustrative non-limiting examples of saturated aliphatic triacrylates and trimethacrylates include:

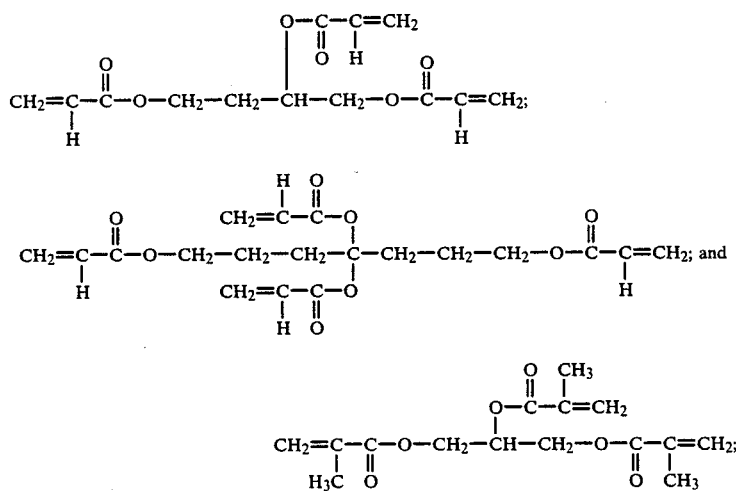

Some illustrative non-limiting examples of aromatic triacrylates and trimethacrylates include Some illustrative non-limiting examples of saturated aliphatic and aromatic tetraacrylates and tetramethacrylates include:

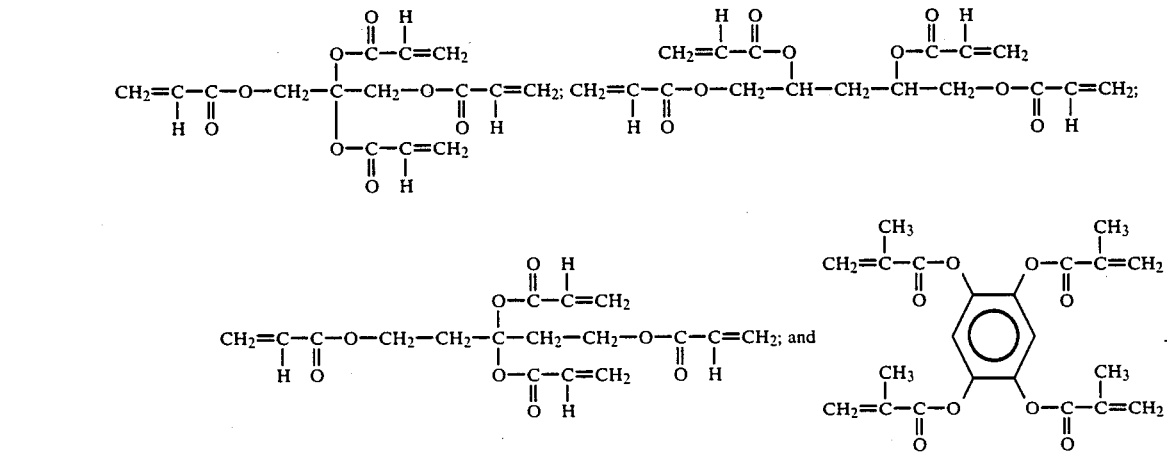

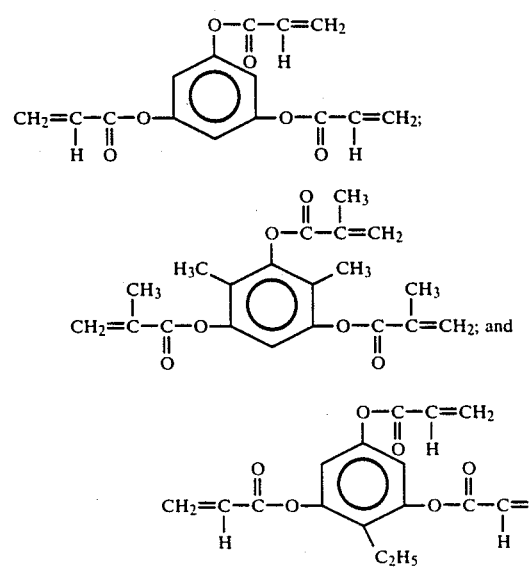

The polyacrylates and polymethacrylates and their preparation are well known in the art. Indeed, many of the polyfunctional acrylates and methacrylates are commercially available or may be prepared by well known and conventional methods. One of the methods of producing the di-, tri- and tetraacrylate esters involves reacting acrylic acid or methacrylic acid with a di-, tri- to tetrahydroxyl containing compound to produce the diester, triester, or tetraester. Thus, for example, acrylic acid can be reacted with ethylene glycol to produce ethylene glycol diacrylate.

Although the coating compositions of the instant invention may contain only one of said polyfunctional acrylate or methacrylate monomers, preferred coating compositions contain a mixture of two or more different polyfunctional monomers, preferably a diacrylate and a triacrylate. When the coating compositions contain a mixture of acrylate monomers it is preferred that the ratio, by weight, of the diacrylate or dimethacrylate to a higher functional monomer such as the triacrylate be from 30:70 to about 70:30. Exemplary mixtures of diacrylates and triacrylates include mixtures of hexanediol diacrylate with pentaerithritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

While the corresponding coatings may likewise contain the polymerized photoreaction products of a single polyfunctional acrylate or methacrylate monomer, coatings containing the polymerized photoreaction products of two different polyfunctional acrylate or or methacrylate monomers, preferably a diacrylate and a triacrylate.

Generally, the coating composition contains from about 70 to about 95 weight percent of said polyfunctional acrylate monomers. The UV cured methacrylate monomers, preferably a diacrylate and a triacrylate.

Generally, the coating composition contains from about 70 to about 95 weight percent of said polyfunctional acrylate monomers. The UV cured coating contains from about 70 to about 95 weight percent of the photocured reaction products of said polyfunctional acrylate monomers.

The phenyl ketone photoinitiator or photosensitizer of the instant invention may be represented by the general formula:

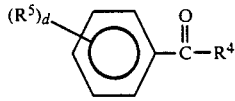

III.

wherein:

$R^5$ is independently selected from halogen, hydroxy, monovalent hydrocarbon, substituted monovalent hydrocarbon, monovalent hydrocarbonoxy, or substituted monovalent hydrocarbonoxy radicals;

$R^4$ is selected from monovalent hydrocarbon radicals, substituted monovalent hydrocarbon radicals, monovalent hydrocarbon radicals containing at least one ether linkage, or substituted monovalent hydrocarbon radicals containing at least one ether linkage:

and d is an integer having a value of from 0 to 5 inclusive.

The monovalent hydrocarbon radicals represented by $R^4$ and $R^5$ are prefereably those containing from 1 to about 20 carbon atoms. They include the alkyl, aryl, aralkyl, alkaryl, and cycloalkyl radicals. The preferred alkyl radicals are those containing from 1 to about 20 carbon atoms. They may be straight chain or branched alkyl radicals. The preferred cycloalkyl radicals are those containing from about 4 to about 8 ring carbon atoms. The preferred aralkyl and alkaryl radicals are those containing from 7 to about 20 carbon atoms. The preferred aryl radicals are those containing from 6 to 12 ring carbons, i.e., phenyl, naphthyl, and biphenyl.

The substituted monovalent hydrocarbon radicals are those monovalent hydrocarbon radicals described above which contain substituent groups thereon, preferably from 1 to about 4 substituent groups. The preferred substituent groups are the halogens, preferably chlorine and bromine, and hydroxyl groups. When more than one substituent group is present they may be the same or different.

The monovalent hydrocarbonoxy radicals represented by $R^5$ may be represented by the formula $-OR^6$ wherein $R^6$ is a monovalent hydrocarbon radical of the type described hereinafore.

The substituted monovalent hydrocarbonoxy radicals represented by $R^5$ may be represented by the formula $-OR^{6'}$ wherein $R^{6'}$ is a substituted monovalent hydrocarbon radical of the type described hereinafore.

The monovalent hydrocarbon radicals containing at least one ether linkage represented by $R^4$ generally have the formula $-R'+R''O+_fO-R_7$ wherein $R'$ and $R''$ are independently selected from divalent hydrocarbon radicals, $R^7$ is a monovalent hydrocarbon radical of the type described hereinafore, and f has a value of from 0 to about 20.

The divalent hydrocarbon radicals represented by $R'$ and $R''$ are preferably those containing from 1 to about 20 carbon atoms. They include the alkylene, cycloclakylene, arylene, alkarylene, and aralkylene radicals. The preferred alkylene radicals, which may be either straight chain or branched alkylene radicals, are those containing from 1 to about 20 carbon atoms. The preferred cycloalkylene radicals are those containing from 4 to about 8 ring carbon atoms. The preferred aralkylene and alkarylene radicals are those containing from 7 to about 20 carbon atoms. The preferred arylene radicals are those containing from 6 to 12 ring carbon atoms, i.e, phenylene, naphthalene, and biphenylene. The preferred divalent hydrocarbon radicals are the alkylene radicals.

It is to be understood that the divalent hydrocarbon radicals represented by $R'$ and $R''$, as well as the monovalent hydrocarbon represented by $R^7$, may contain substituent groups thereon, preferably from 1 to about 4 substituent groups, which may be the same or different if more than one substituent group is present. The preferred substituent groups are the halogens, preferably chlorine and bromine, and hydroxyl groups. When these substituent groups are present on the monovalent hydrocarbon radicals containing at least one ether linkage such radicals are the substituted monovalent hydrocarbon radicals containing at least one ether linkage.

Preferred phenyl ketones of Formula III are those wherein $R^5$ is a monovalent hydrocarbon radical, preferably an alkyl, or a monovalent hydrocarbonoxy radical, preferably an alkoxy radical, and $R^4$ is a monovalent hydrocarbon radical , preferably an alkyl radical, or a substituted monovalent hydrocarbonoxy radical, preferably a substituted alkyl radical.

The phenyl ketones of Formula III are well known compounds which are generally commercially available or may be readily prepared by well known and conventional methods.

Some illustrative non-limiting examples of these phenyl ketones include:

p-phenoxy-2,2-dichloroacetophenone; p-methoxy-2,2-dichloroacetophenone; 2-hydroxy-2,2-dimethylacetophenone; 2-hydroxy-2,2-diethylacetophenone; 2-hydroxy-2,2-dipropylacetophenone; p-isopropyl-2-hydroxy-2,2-dimethylacetophenone; p-isopropyl-2-hydroxy-2,2-diethylacetophenone; p-n-butyl-2-hydroxy-2-methyl-2-ethylacetophenone; p-dodecyl-2-hydroxy-2,2-dimethylacetophenone; p-phenoxy-2,2-dibromoacetophenone; 2,2-dibromoacetophenone; 2,2-dichloroacetophenone; 2,2-dimethylacetophenone; 2-hydroxy-2,2-cyclohexylacetophenone; p-cyclohexyl-2,2-dibutylacetophenone; 2-2,dimethoxy-2-phenylacetophenone; and 1-hydroxycyclohexane phenyl ketone.

The amount of the phenyl ketone photosensitizer present in the coating composition is a photosensitizing or photoinitiating amount. By photosensitizing or photoinitiating amount is meant an amount effective to effect the photocure of the polyfunctional acrylate monomers to the polymeric cross-linked state. Generally, this amount is from about 0.05 to about 10 weight percent, preferably from about 0.1 to about 5 weight percent. Weight percent of photoinitiator is based on the total amounts of polyfunctional acrylate monomers and photoinitiator present in the coating composition.

The coating composition also contains an active ultraviolet radiation absorber or stabilizer selected from the benzotriazoles, cyanoacrylates, hydroxybenzophenones, or mixtures thereof. These ultraviolet radiation absorbers are active rather than latent absorbers. That is to say they absorb ultraviolet radiation from the start rather than being converted into active UV absorbers upon exposure to ultraviolet radiation as is the case with resorcinol monobenzoate.

These ultraviolet radiation absorbers are well known in the art and are generally commercially available or may be readily prepared by known and conventional methods. These ultraviolet radiation absorbers are amply described in the literature. The benzotriazole and hydroxybenzophenone ultraviolet radiation absorbers are described in U.S. Pat. Nos. 3,309,220, 3,049,443, 3,043,709, 2,976,259, and 4,410,594, all of which are incorporated herein by reference.

Some illustrative non-limiting examples of the benzotriazoles and hydroxybenzophenones include:

2,2'-dihdroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4-methoxy-4'-ethoxybenzophenone; 2,2'-dihydroxy-4-methoxy-4'-propxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6,-tributoxybenzophenone; 2-hydroxy-4-butoxy-4',5'-dimethoxybenzophenone;. 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-methoxybenzophenone; 2-hydroxy-4-ethoxybenzophenone; 2-hydroxy-4-methoxy-4'-methylbenzophenone; 2-hydroxy-4-methoxy-4'-ethylbenzophenone; 2-hydroxy-4-methoxy-4'-chlorobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4-ethoxy-4'-methylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-chlorobenzophenone; 2-hydroxy-4-ethoxy-4'-bromobenzophenone; 2-(2'-hydroxy-5'-methylphenyl)benzotriazole; 2-(2'-hydroxy-5'-tert-butylphenyl)benzotriazole; 2-(2'-hydroxy-3'-methyl-5'-tert-butylphenyl)benzotriazole; 2-(2'-hydroxy-5'-cyclohexylphenyl)benzotriazole; 2-(2'-hydroxy-3',5'-dimethylphenyl)benzotriazole; 2-(2'-hydroxy-5'-tert-butylphenyl)-5-chlorobenzotriazole; and 2-(2'-hydroxy-3'-di-tert-butylphenyl)benzotriazole Among the cyanoacrylates useful as ultraviolet radiation stabilizers are those represented by the general formula

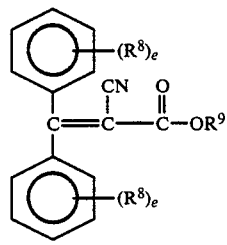

IV.

wherein:

R$^9$ is an alkyl, cycloalkyl, hydroxyalkyl, or hydroxycycloalkyl;

$^8$ is independently selected from monovalent hydrocarbon radicals, halogen radicals, hydroxy radicals, or monovalent hydrocarbonoxyradicals; and e is independently selected from integers having a value of from 0 to 5 inclusive The monovalent hydrocarbon radicals represented by R$^8$ are those as described for R$^4$ hereinafore. The monovalent hydrocarbonoxy radicals represented by R$^8$ are those having the formula —OR$^{10}$ wherein R$^{10}$ is a monovalent hydrocarbon radical of the type described hereinafore. The preferred hydrocarbonoxy radicals are the alkoxy radicals.

Preferred alkyl radicals represented by R$^9$ are those containing from 1 to about 10 carbon atoms. Preferred cycloalkyl radicals are those containing from about 4 to about 8 ring carbon atoms. Preferred hydroxyalkyl radicals are those containing one hydroxyl group and from 1 to about 10 carbon atoms. Preferred hydroxycycloalkyl radicals are those containing one hydroxyl radical bonded to a ring carbon atoms of a C$_4$–C$_8$ cycloalkyl.

Preferred compounds of Formula IV are those wherein e is zero. The cyanoacrylates useful in the practice of this invention are described, inter alia, in U.S. Pat. No. 4,129,667, incorporated herein by reference.

The amount of the active ultraviolet radiation stabilizers present in the instant coating composition is an effective amount, i.e., an amount effective to protect the underlying aromatic carbonate resin from degradation by ultraviolet radiation. Generally, this effective amount is an amount sufficient so that the absorbance of the coating at λ maximum is at least one, which corresponds to absorption at λ maximum of at least 90% of the incident ultraviolet radiation by the cured coating. The absorbance is calculated using the relationship $A = \log(I_o/I)$ wherein A is the absorbance, $I_o$ is the intensity of incident light, and I is the intensity of transmitted light. Generally, this amount is from about 3 to about 15 weight percent, preferably from about 4 to about 12 percent, and more preferably from about 5 to about 10 weight percent. Weight percent of ultraviolet radiation absorber is based on the total amounts of polyfunctional acrylate, photoinitiator, and the UV radiation stabilizer present.

One of the advantages of the instant invention is that relatively large amounts of UV stabilizer can be present in the coating composition without deleteriously affecting the cure of the composition. With conventional coating compositions if relatively large amounts of UV absorber, i.e., above about 5 weight percent, are present in the coating compositions the photocuring of these compositions containing these large amounts of active UV absorbers is seriously impared.

It is to be understood that only one UV absorber can be present or mixtures of two or more different UV absorbers of the instant invention may be utilized.

In the practice of the instant invention the photocurable coating compositions are first prepared by mixing together the polyfunctional acrylate monomer or monomers, the photoinitiator, and the active ultraviolet radiation absorber. Additionally, if so desired to reduce the viscosity of the coating formulation an organic solvent such as alcohol may optionally be incorporated into the coating formulation. This solvent should preferably one which is non-aggresive towards the aromatic carbonate resin and which evaporates readily. The various components are thoroughly mixed together so as to form a generally homogeneous coating composition. A thin, uniform layer of this coating composition is then applied onto at least one surface of the substrate by any of the known means such as spraying, dipping, painting, or roll coating. The coating composition is then cured, preferably in an inert atmosphere such as nitrogen, by exposure to ultraviolet radiation which can have a wavelength of from 1849 A. to 4000 A. The lamp system used to generate such radiation can consist of ultraviolet lamps of the discharge type, for example xenon, metallic halide, metallic arc such as high or low pressure mercury vapor discharge lamps, etc., having operating pressures from as low as a few millitorr up to about 10 atmospheres.

The coating should be thick enough to at least provide protection against surface scratching or abrasion, attack by chemical solvents, and the deleterious affects of ultraviolet radiation. Generally, this minimum thickness is at least about 0.05 mil. The maximum thickness of the coating is not critical but is controlled by secondary considerations such as appearance, cost, rate of cure of the coating composition, and the like. Generally, a thickness of less than about 3 mils is preferred.

The photocured coating compositions of the instant invention are thus comprised of the (i) cured reaction products of at least one polyfunctional acrylate monomer, and (ii) at least one active UV absorber selected from benzotriazoles, cyanoacrylates, and hydroxybenzophenones. The cured coating will, of course, also contain the acetophenone photoinitiator which was present in the coating composition.

The coating compositions of the instant invention, as well as the cured coatings, may also optionally contain any of the well known and commonly used additives such as, for example, fillers; surface active agents; antioxidants: and the like. A particularly useful surface active agent or surfactant is a silicone surfactant. The silicone surfactants are well known in the art and are generally commercially available. They may include the silcione fluids such as the polysiloxane fluids, particularly the diorganopolysiloxane fluids. However, the preferred silicone surfactants for use in the present invention are the polysiloxane-polyether block copolymer surfactants. The preferred polysiloxane-polyether block copolymers are represented by the general formula

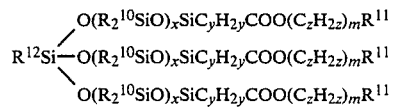

wherein:

$R^{10}$ is independently a monovalent hydrocarbon radical;

$R^{12}$ is a monovalent hydrocarbon radical;

$R^{11}$ is a lower alkyl radical;

x has a value of at least two, for example from 2 to about 40 or more;

y has a value of 2 or 3;

z has a value of from 2 to 4 inclusive; and m has a value of at least 5, for examples from 5 to 100.

Among the radicals represented by and $R^{10}$ and $R^{12}$ are alkyl, cycloalkyl, aryl, aralkyl and alkaryl radicals. The preferred alkyl radicals are those containing from 1 to about 20 carbon atoms. The preferred cycloalkyl radicals are those containing from about 4 to about 8 ring carbon atoms. The preferred aralkyl and alkaryl radicals are those containing from 7 to about 14 carbon atoms. The preferred aryl radicals are those containing from 6 to 12 ring carbon atoms, i.e., phenyl, naphthyl, and biphenyl. The monovalent hydrocarbon radicals represented by and $R^{10}$ and $R^{12}$ may also contain substituent groups thereon, preferably from 1 to about 3 halogen radicals.

The preferred lower alkyl radicals represented by $R^{12}$ are those containing from 1 to about 5 carbons.

In a preferred embodiment of the instant invention both $R^{10}$ and $R^{12}$ are alkyl or aryl radicals with methyl and phenyl being preferred.

The preparation of these polysiloxane-polyether block copolymers is described in U.S. Pat. Nos. 3,182,076 and 3,629,156, incorporated herein by reference.

These surfactants may be present in the coating composition in amounts of from about 0.05 to about 3 weight percent, based on the weight of the polyfunctional acrylate monomer.

PREFERRED EMBODIMENT OF THE INVENTION

In order to more fully and clearly illustrate the present invention the following specific examples are presented. It is intended that the examples be considered as illustrative rather than limiting the invention disclosed and claimed herein. In the examples all parts and percentages are parts and percentages by weight unless otherwise specified.

The following examples illustrate the present invention.

EXAMPLE 1

A coating composition is prepared by mixing together 50 parts by weight of trimethylolpropanetriacrylate, 50 parts by weight of hexanedioldiacrylate, 5 parts by weight of 2-(2'-hydroxy-5'-t-octylphenyl)benzotriazole, 5 parts by weight of 2-hydroxy-2,2-dimethylacetophenone, and 0.5 parts by weight of surfactant.

The resulting coating composition is applied onto a polycarbonate test panel with a no. 6 wire wound bar. The coated panel is then passed through a nitrogen blanketed UV curing processor containing two medium pressure mercury lamps at a conveyor speed of 50 ft/min. The cured coating is hard, tack free, and abrasion and solvent resistant. The coated and cured polycarbonate test panels are exposed to accelerated weathering in a UVCON apparatus. In this accelerated weathering test samples are inserted into an accelerated weathering device sold by the Atlas Electric Devices Company. This device is set to alternating consecutive cycles of fluorescent ultraviolet light at 70° C. for 8 hours and high humidity at 50° C. for 4 hours. The test samples are exposed to this accelerated weathering for 1,000 hours. At the end of this period the adhesion of the coating to the polycarbonate substrate is still excellent and the increase in Yellowness Index (as measured in accordance with ASTM D1925) was 3.9 units.

EXAMPLE 2

The procedure of Example 1 is substantially repeated except that the 5 parts by weight of the 2-hydroxy-2,2-dimethylacetophenone photoinitiator are replaced with 5 parts by weight of 1-hydroxycyclohexylphenyl ketone. The cured coating is hard, tack-free, and abrasion and solvent resistant. After 1,000 hours of accelerated weathering the adhesion of the coating to the polycarbonate substrate is still good and the increase in Yellowness Index was 3.5 units.

What is claimed is:

1. An ultraviolet radiation curable coating composition consisting essentially of:
   (i) at least one polyfunctional acrylate monomer;
   (ii) at least one active ultraviolet radiation absorber selected from the group consisting of benzotriazoles, cyanoacrylates, and hydroxybenzophenones and mixtures thereof, said ultraviolet radiation absorber being present at a level of from about 5 to about 10 weight percent based on the total weight of polyfunctional acrylate monomers, photoinitiators and UV radiation absorber present in the composition; and
   (iii) a photoinitiator selected from the group consisting of 2-hydroxy-2,2-dimethylacetophenone, 1-hydroxy cyclohexane phenyl ketone, and 2,2-dimethoxy-2-phenylacetophenone, said photoinitiator being present at a level of from about 0.05 to about 10 weight percent based on the total weight of the polyfunctional acrylate monomer and photoinitiator present in the coating composition.

2. The composition of claim 1 which contains from about 0.1 to about 5 weight percent of said photoinitiator.

3. The composition of claim 1 wherein said ultraviolet radiation absorber is a benzotriazole.

4. The composition of claim 1 wherein said polyfunctional acrylate monomer is comprised of at least one diacrylate monomer and at least one triacrylate monomer.

5. An ultraviolet radiation curable coating composition consisting essentially of:
   (i) at least one polyfunctional acrylate monomer;
   (ii) at least one active ultraviolet radiation absorber selected from the group consisting of benzotriazoles, cyanoacrylates, and hydroxybenzophenones and mixtures thereof, said ultraviolet radiation absorber being present at a level of from about 5 to about 10 weight percent based on the total weight of polyfunctional acrylate monomers, photoinitiators and UV radiation absorber present in the composition; and
   (iii) a photoinitiator, said photoinitiator being 2-hydroxy-2,2-dimethylacetophenone, said photoinitiator being present at a level of from about 0.05 to about 10 weight percent based on the total weight of the polyfunctional acrylate monomer and photoinitiator present in the coating composition.

6. An ultraviolet radiation curable coating composition consisting of:
   (i) at least one polyfunctional acrylate monomer;
   (ii) at least one active ultraviolet radiation absorber selected from the group consisting of benzotriazoles, cyanoacrylates, and hydroxybenzophenones and mixtures thereof, said ultraviolet radiation absorber being present at a level of from about 5 to about 10 weight percent based on the total weight of polyfunctional acrylate monomers, photoinitiators and Uv radiation absorber present in the composition; and
   (iii) a photoinitiator selected from the group consisting of 2-hydroxy-2,2-dimethylacetophenone, 1-hydroxy cyclohexane phenyl ketone, and 2,2-dimethoxy-2-phenylacetophenone, said photoinitiator being present at a level of from about 0.05 to about 10 weight percent based on the total weight of the polyfunctional acrylate monomer and photoinitiator present in the coating composition.

* * * * *